(12) United States Patent
Engström

(10) Patent No.: US 9,430,718 B1
(45) Date of Patent: Aug. 30, 2016

(54) EFFICIENT LOCAL FEATURE DESCRIPTOR FILTERING

(71) Applicant: Sony Corporation, Tokyo (JP)

(72) Inventor: Jimmy Engström, Malmö (SE)

(73) Assignee: Sony Corporation, Tokyo (JP)

( * ) Notice: Subject to any disclaimer, the term of this patent is extended or adjusted under 35 U.S.C. 154(b) by 54 days.

(21) Appl. No.: 14/617,373

(22) Filed: Feb. 9, 2015

(51) Int. Cl.
*G06K 9/48* (2006.01)
*G06K 9/62* (2006.01)
*G06K 9/52* (2006.01)
*G06F 17/30* (2006.01)

(52) U.S. Cl.
CPC ......... *G06K 9/6215* (2013.01); *G06F 17/3028* (2013.01); *G06F 17/30256* (2013.01); *G06K 9/52* (2013.01); *G06K 9/6218* (2013.01)

(58) Field of Classification Search
USPC ........ 382/170, 171, 190, 209, 218; 345/536, 345/547, 556, 557
See application file for complete search history.

(56) References Cited

U.S. PATENT DOCUMENTS

| | | | |
|---|---|---|---|
| 6,285,995 B1 | 9/2001 | Abdel-Mottaleb et al. | |
| 6,400,996 B1 * | 6/2002 | Hoffberg | G05B 19/0426 370/218 |
| 6,625,319 B1 | 9/2003 | Krishnamachari | |
| 7,062,083 B2 * | 6/2006 | Lim | G06F 17/3025 382/164 |
| 7,211,797 B2 * | 5/2007 | Nishiyama | H01J 37/026 250/307 |
| 7,747,151 B2 * | 6/2010 | Kochi | G01B 11/24 348/50 |
| 8,442,321 B1 * | 5/2013 | Chang | G06K 9/6202 382/173 |
| 8,472,677 B2 * | 6/2013 | Sagan | G07D 7/2041 358/1.18 |
| 8,542,252 B2 * | 9/2013 | Perez | G06K 9/00201 345/420 |
| 8,593,696 B2 * | 11/2013 | Picard | G03G 21/046 283/902 |
| 2010/0310186 A1 | 12/2010 | Liu et al. | |
| 2010/0316290 A1 | 12/2010 | Jia | |
| 2011/0305399 A1 | 12/2011 | Zitnick et al. | |
| 2015/0052139 A1 | 2/2015 | Cevahir et al. | |

FOREIGN PATENT DOCUMENTS

| | | |
|---|---|---|
| EP | 2 757 521 A1 | 7/2014 |
| WO | WO 99/67695 A2 | 12/1999 |
| WO | WO 2015/006894 A1 | 1/2015 |

OTHER PUBLICATIONS

International Search Report, Application No. PCT/IB2015/056001, Dec. 2, 2015.
Rubner et al., "The Earth Mover's Distance as a Metric for Image Retrieval", *International Journal of Comuter Vision*, vol. 40, No. 2, Jan. 2000, pp. 99-121.
Shi et al., "Feature-Based Image Set Compression", *2013 IEEE International Conference on Multimedia and Expo (ICME)*, San Jose, CA, Jul. 15-19, 2013, 6 pp.
Zheng et al., "A Novel Video Coding Scheme with Frequency-Domain-based Conditional Frame Replenishment Algorithm", *International Conference on Information, Communications and Signal Processing (ICICS '97)*, Singapore, Sep. 9-12, 1997, pp. 274-278.
International Search Report, Application No. PCT/IB2015/056003, Nov. 20, 2015.
Ananth et al., "Feature Extraction and Selection for Image Retrieval", *International Journal of Soft Computer*, 3(2):84-87, 2008.

* cited by examiner

*Primary Examiner* — Yosef Kassa
(74) *Attorney, Agent, or Firm* — Myers Bigel & Sibley, P.A.

(57) ABSTRACT

The present disclosure generally relates to methods and computer program products for searching for a similar image among a plurality of stored images, and in particular to a method and computer program product used in a content based image retrieval system where roughly similar images are clustered and feature vectors for the clustered images are filtered based on a matching frequency for the feature vectors among the images in the cluster.

14 Claims, 4 Drawing Sheets

EFFICIENT LOCAL FEATURE DESCRIPTOR FILTERING

TECHNICAL FIELD

The present disclosure generally relates to methods and computer program products for searching for a similar image among a plurality of stored images, and in particular to a method and computer program product used in a content based image retrieval system where roughly similar images are clustered and feature vectors for the clustered images are filtered based on a matching frequency for the feature vectors among the images in the cluster.

TECHNICAL BACKGROUND

Searching for images similar to a certain image among a plurality of images is a well-used feature in today's image retrieval system. Most traditional and common methods of image retrieval utilize some method of manual image annotation which rely on that a person manually adds metadata such as keywords to the images so that retrieval can be performed over the metadata words. Manual image annotation is time-consuming, laborious and expensive.

Instead, Content-based image retrieval (CBIR) system may be employed. In such system, feature descriptors of each image in the system are calculated. One problem that often occurs in such CBIR system is the sheer computational complexity to compare all features descriptors from one image, with all the feature descriptors from all the other images. Using one of the most common feature descriptors, SIFT (Scale-Invariant Feature Transform) can generate more than 20000 descriptors for a single image. Comparing 20000 SIFT vectors in an image, with the same amount of vectors in all images in a system, e.g. 10000 images, results in a very high computational load and a slow CBIR system.

It is thus desired to reduce the computational load and increase the speed of a CBIR system.

SUMMARY OF THE INVENTION

The present invention generally aims at eliminating or at least reducing the problems discussed above as well as other problems. This is accomplished with methods and software's in accordance with the appended independent claims.

According to a first aspect, the present invention is realized by a method for searching for a similar image among a plurality of stored images, comprising the steps of: for each stored image, calculating only one feature vector representing the content of the stored image, calculating distance measures between each stored image of the plurality of stored images by using the one feature vector calculated for each image, clustering the plurality of stored images into one or more clusters of stored images based on the calculated distance measures, wherein each cluster comprises one or more stored images.

The method further comprises, for each cluster comprising a plurality of stored images, and for each stored image in the cluster, calculating a plurality of feature vectors, each representing the content of the stored image.

The next step in the method is to perform a matching operation between at least some of the plurality of feature vectors for all of the stored images in the cluster, and based on a result of the matching operation, filtering feature vectors which are matched between at least a threshold number of the stored images, and storing the filtered feature vectors.

Then an image for which a similar image should be found is retrieved, and a plurality of additional feature vectors for the retrieved image is calculated. The stored filtered feature vectors for at least one of the one or more clusters, and the additional feature vectors are then used for finding a similar image among the plurality of stored images.

By the term "feature vector" should, in the context of present specification, be understood to define one or a combination of feature descriptors of the image. The feature vector may have any dimensionality. An example of a descriptor may be a histogram of the colors in the image, or a set of SIFT/SURF vectors.

By the term "distance measure" should, in the context of present specification, be understood to define how similar two images are when considering the content of the images. By using feature vectors for calculating such distance measure, irrelevant things as noise in the images, or small differences in position of leaves etc. between the images, are not considered when calculating the distance measure.

The present invention is based on the realization that by utilizing clusters, where similar images are already grouped together, an efficient feature vector or feature descriptor filtering can be achieved by guiding the filtering algorithm toward the relevant features (SIFT, SURF or other feature descriptors). This will in the end make a very fast and also accurate image retrieval system, where similar objects, faces, buildings etc. can be found.

By using only one feature vector for clustering the plurality of images into one or more clusters, a quick and computational efficient method for clustering roughly similar images is achieved. The one feature vector should advantageously represent a global descriptor of the image, such as the color histogram of the image. In this case, the color histogram may be calculated on a down sampled version of the image, or the color histogram may be clustered.

The clustering may be adapted such that the distance measures between the images within cluster are small or large, meaning that images within a cluster may be more or less similar.

By filtering out filter out the feature vectors that do not exist in at least a threshold percentage of the images, much of the noise, such as pointless feature vectors on grass, water and other moving textures that does not describe valuable features, will be removed. However, feature vectors describing objects in the water, on the grass etc. and that exist in several images in a cluster will still be kept.

In a second aspect, the present invention provides a computer program product comprising a computer-readable storage medium with instructions adapted to carry out the method as described herein when executed by a device having processing capability.

Other objectives, features and advantages of the present invention will appear from the following detailed disclosure, from the attached dependent claims as well as from the drawings.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise.

BRIEF DESCRIPTION OF DRAWINGS

The above, as well as additional objects, features and advantages of the present invention, will be better under- FIG. 1 describe by way of example a method for clustering images and removing feature vectors which are not matched between at least a threshold number of images in a cluster, FIG. 2 describe by way of example how the clusters, determined using the method described in FIG. 1, and the filtered feature vectors for each cluster are used for finding a similar image of a retrieved image, FIG. 3 describe by way of example how a matching cluster is found for a retrieved image, FIG. 4 describe by way of example how a similar image among a plurality of images in the matching cluster of FIG. 3 is found for the retrieved image, FIG. 5 describe by way of example how ordering the images in a cluster in a tree data structure can improve the speed of finding a similar image for a retrieved image.

DETAILED DESCRIPTION OF EXAMPLE EMBODIMENTS

Figure 1:
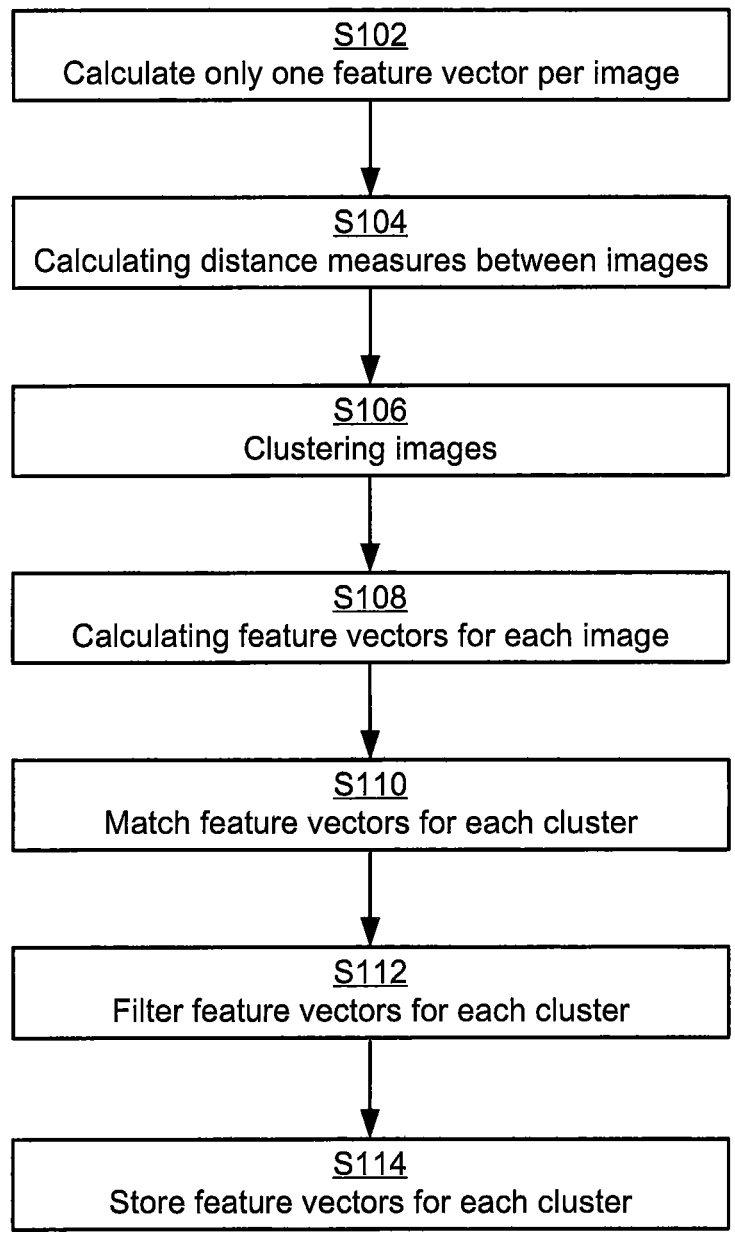

FIG. 1 describe by way of example a way of clustering similar images in order to guide a filtering algorithm for feature vectors towards relevant feature vectors. As described above, such an approach may efficiently remove pointless feature vectors, e.g. on grass, water and other moving textures, which do not describe valuable features of the images in the cluster. By employing such filtering, efficient searching for a similar image among a plurality of stored images may be facilitated. The first step of the method is to, for each stored image, calculating S102 only one feature vector representing the content of the stored image. The feature vector may be a global feature vector, which describe the entire content of the stored image in a good way. There are many suitable available algorithms for calculating such global feature vector. For example, a color histogram of the image can be calculated. Further examples of a global feature vector are a vector describing a mini-thumbnail of the image, e.g. down to 64*64 pixels large, or a histogram of pixel values, e.g. clustered into 64, 128 or 256 discrete groups. According to some embodiments, the image is divided into a grid of e.g. 5×4 blocks and a color histogram is calculated for each block. Then the color histograms (with optionally clustered values) are concatenated into one feature vector.

The only one feature vector may be calculated based on an interpolated version of the stored image. Using an interpolated version of the stored image for calculating the global feature vectors have several advantages. Firstly, it requires less computational calculations. Secondly, uninteresting features, e.g. noise, in the image may be removed when performing the interpolation.

The next step is to calculate S104 distance measures between each image of the plurality of stored images by using the only one feature vector calculated for each image. This step may comprise calculating a Euclidian distance between each global feature vector and using this distance as a distance measure. Other ways of calculating the distance measure, such as Squared Euclidean Distance, may be employed.

According to other embodiments, when calculating the distance measure between two images, an earth mover's distance (EMD) algorithm may be used. For example, each of the two images can be divided into a few big areas (e.g. 2×2 blocks, 3×2 blocks etc.), and then the color histogram similarity between the blocks can be calculated by using the EMD algorithm. This method is not very sensitive to variations in color shifts nor is it sensitive to noise.

Subsequent to calculating S104 the distance measures, a clustering algorithm is performed S106 using the calculated distance measures. This results in one or more clusters, each cluster comprising one or more stored images. Any suitable clustering algorithm may be used, e.g. using a hard threshold for the distance measure, using a nearest neighbor algorithm, using a Random sample consensus (RANSAC) algorithm etc.

Now one or more clusters have been created, wherein each cluster comprises images which are more or less similar to each other, depending on the clustering algorithm used and the type feature vector used for calculating the distances. Within these clusters, further feature vectors can now be calculated and then filtered in order to just keep relevant feature vectors to be stored. First, a plurality of feature vectors are calculated S108 for each of the stored images. According to some embodiments, such feature vectors already exist and need thus not be calculated. When a plurality of feature vectors are calculated S108 for each image, each may represent a sub-area in the image, e.g. local feature vectors. Each sub-area corresponds to an area in the image in which a point of interest is present, e.g. an edge, and from this point of interest, a gradient may be calculated and used as a feature vector. Such plurality of feature vectors may be calculated using any suitable feature detection algorithm, e.g. by using one or more from the list of: a Scale-invariant feature transform (SIFT) algorithm, a Speeded Up Robust Features (SURF) algorithm, a Features From Accelerated Segment Test (FAST) algorithm and a Binary Robust Independent Elementary Features (BRIEF) algorithm.

When such feature vectors are calculated S108, a matching operation between the plurality of feature vectors for all of the stored images in a cluster are performed. The matching operation may comprise calculating distance measures (e.g. Euclidian distance) between all the feature vectors of all the images in a cluster. Subsequently, a hard threshold for distance measures may be employed, or a nearest neighbor algorithm, or using a Random sample consensus (RANSAC) algorithm, ratio test etc. According to some embodiments, only a subset of the feature vectors for each image is used for the matching operation, using e.g. RANSAC. This may reduce the computational complexity of the matching procedure and still result in that most of the matching feature vectors are found.

Figure 2:
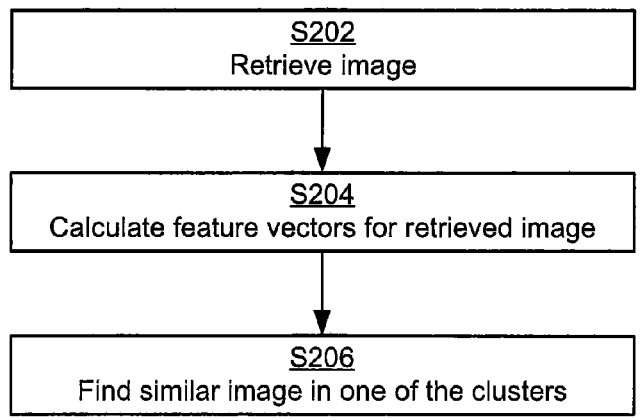

Based on a result of the matching operation, feature vectors which are matched between at least a threshold number of the stored images are kept, or filtered, S112 and stored S114, while feature vectors which are unmatched or only matched between a number of the stored images below the threshold number are discarded. Consequently, a system, e.g. a CBIR system, implementing the method of described in FIG. 1, only needs to store a small subset of the feature vectors, which may reduce resource usage substantially. These stored feature vectors can then be used for searching for a similar image to a retrieved image. This is shown in FIG. 2. It should be noted that the steps shown in conjunction with FIG. 1 and the steps shown in FIG. 2 do not have to be performed close in time. In other words, the steps of clustering images and filtering feature vectors could be performed at a totally different time, e.g. whenever the computer system implementing the method is in low load, than the steps of finding the similar image for the retrieved image which are performed when the user asks for it.

In FIG. 2, firstly, an image for which a similar image should be found is retrieved S202. The next step comprises calculating a plurality of additional feature vectors for the retrieved image, advantageously using the same algorithm(s) as employed in step S108 above.

These additional feature vectors and the stored filtered feature vectors for at least one of the one or more clusters are then used in order to find S206 a similar image among the plurality of stored images. Example implementation of this step will be shown in conjunction with FIGS. 3-5 below.

Figure 3:
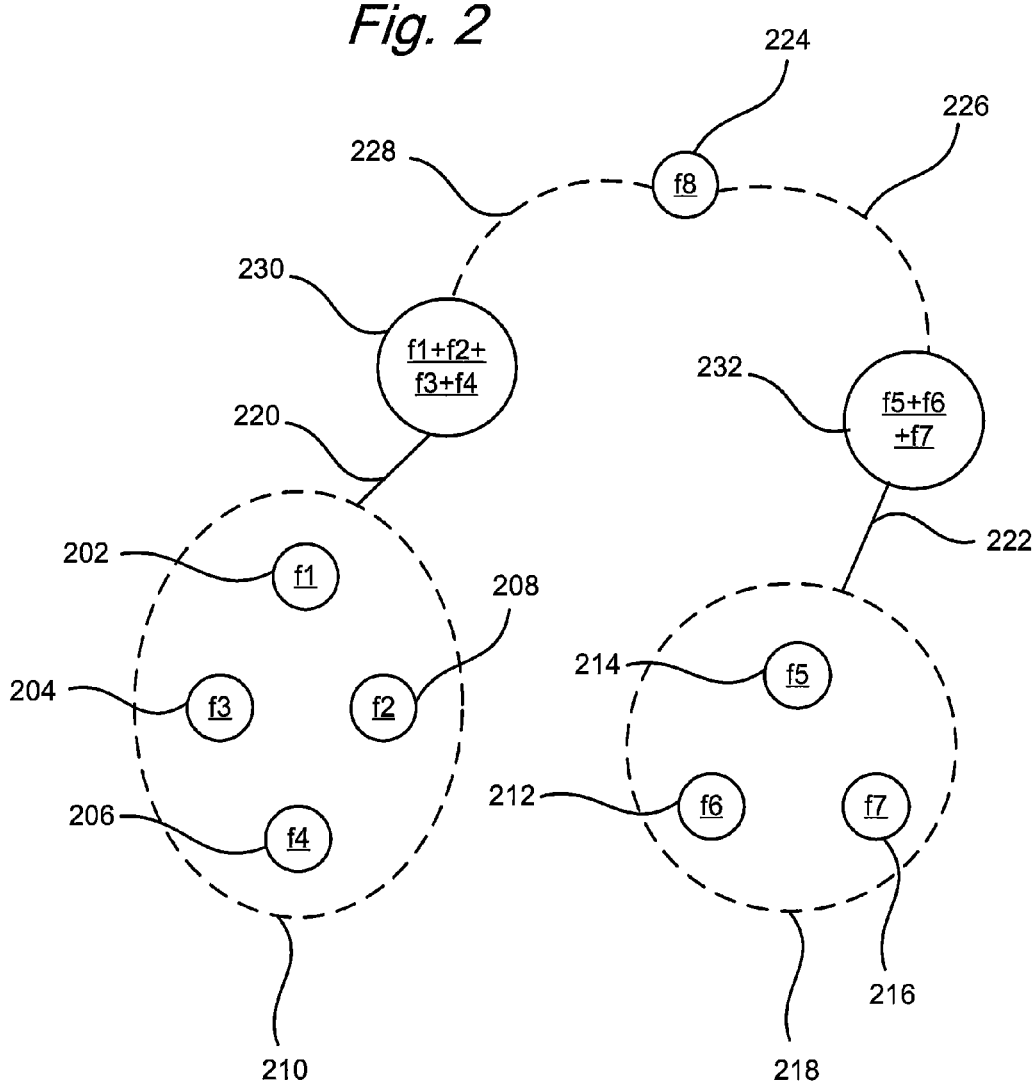

FIG. 3 describe by way of example how a matching cluster for the retrieved image 224 may be found. A plurality of additional feature vectors f8 for the retrieved image 224 have been calculated S202 as described above. FIG. 3 shows two clusters 210, 218 of images. A first cluster 210 comprises four images 202, 204, 206, 208 which each have a set of feature vectors f1-f4 associated with the image. For example, one image 202 in the cluster 210 is associated with a set of feature vectors f1, a further image 204 is associated with another set of feature vectors f3 etc. These feature vectors were kept as the result of the matching operation S110 described above.

According to some embodiments, a set of feature vectors are associated with a corresponding image by also comprising a reference to the stored image. In other words, the step of storing S114 the filtered feature vectors may comprise: for each stored image in plurality of stored images 202, 204, 206, 208, 212, 214, 216 storing the filtered feature vectors f147 corresponding to the content of the stored image with a reference to the stored image.

FIG. 3 further comprises a second cluster 218 which comprises 3 images 212, 214, 216 which each have a set of feature vectors f5-17 associated with the image in the same way as described above in conjunction with the first cluster 210.

According to some embodiments, the step of storing S114 the filtered feature vectors comprises storing the filtered feature vectors with a reference to the cluster. In other words, the features vectors for a cluster are grouped together with a reference to the cluster. This has the effect that it is possible to get the whole cluster as a matching cluster when searching for a similar image to the retrieved image. This narrows down the search for a specific similar image to the images in the matching cluster.

In FIG. 3, such groups of feature vectors 230, 232 are shown for both the clusters 210, 218. The filtered feature vectors f1-f4 are stored as a group 230 and comprises a reference 220 to the cluster 210. The filtered feature vectors f5-f7 are stored as a group 232 and comprises a reference 222 to the cluster 218.

By using such setup as shown in FIG. 3, the step of finding a similar image among the plurality of stored images 202, 204, 206, 208, 212, 214, 216 may comprise finding a matching cluster by comparing 226, 228 the additional feature vectors f8 with the filtered feature vectors f1-f4, f5-f7 for each cluster. The cluster which is chosen as the matching cluster is the cluster where the distance measure between the grouped feature vectors 23, 232 and the additional feature vectors f8 is the smallest and optionally also below a threshold distance measure. In case no matching cluster is found (due to the threshold distance measure being lower than the distance measures calculated from the comparisons 226, 228 between the available clusters 210, 218, and the additional feature vectors f8), no further search for a similar image may be employed and the CBIR system may return an empty image or null as a search result.

Figure 4:
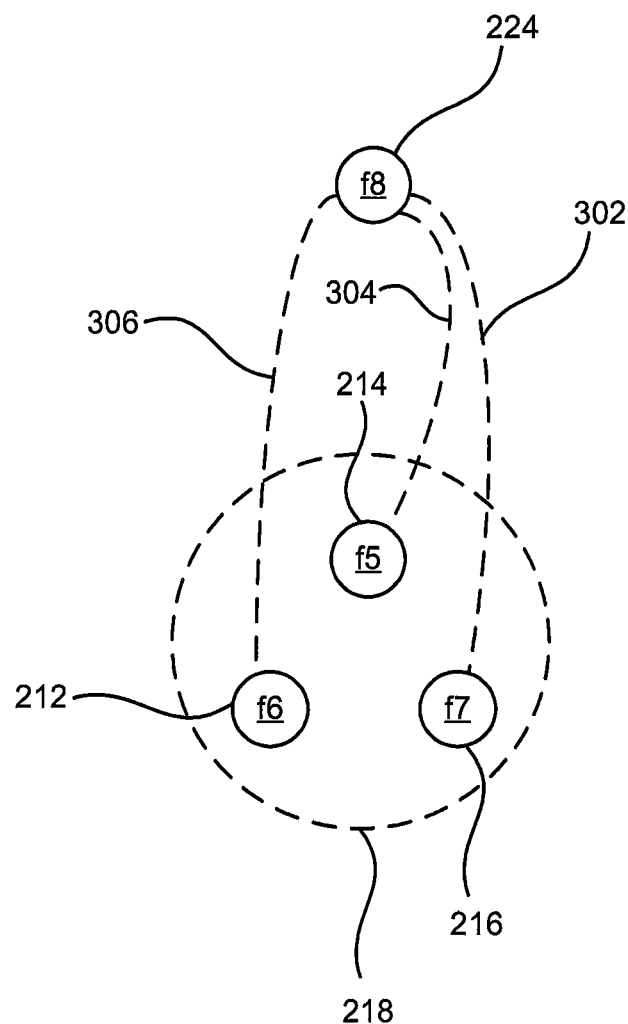

FIG. 4 describe the scenario where the right cluster 218 in FIG. 3 was determined to be the matching cluster. The search for a specific similar image to the retrieved image 224 among the images 212, 214, 216 in the matching cluster 218 may comprise: for at least some images in the matching cluster, comparing 302, 304, 306 the additional feature vectors f8 with the filtered feature vectors f5-f7 corresponding to the content of the stored image. In FIG. 4, the filtered feature vectors f5-f7 of all of the images 212, 214, 216 in the cluster 218 are compared 302, 304, 306 with the additional feature vectors f8 in order to find the closes match. The comparison may comprise calculating distance measures between all the images 212, 214, 216 in the cluster 218, using the feature vectors f5-f7 of the images 212, 214, 216 in the cluster 218 and the additional feature vectors f8. The image corresponding to the smallest distance measure may then be returned as the similar image.

The distance measures between a plurality of feature vectors of two images, or between the grouped feature vectors for a cluster and a set of feature vectors for the retrieved image as described above in conjunction with FIG. 3, may be calculated by any suitable method, e.g. using a SIFT matching algorithm implemented in Matlab or the Euclidian distance. In summary, an Euclidian distance may be calculated between all feature vectors of the first image or cluster with all feature vectors of the second image and cluster, and then all distances that are to large (above a threshold value) will be disregarded when calculating the final distance measure between the two images. A further option is to use the generic framework named ADABOOST for calculating the distance between two images if several different types of local feature vectors are calculated for each image.

According to some embodiments, when searching for a similar image and if not a similar enough image is found, the algorithm may return an empty image, meaning that no similar image was found. According to other embodiments, the algorithm always returns the most similar image.

It should be noted that according to some embodiments, the retrieved image 224 is added to the matching cluster or to the cluster in which a similar image is found. In this case, the additional feature vectors f8 may be filtered according to the filtering already been conducted for this cluster, e.g. only feature vectors among the additional feature vectors f8 which matches to the stored filtered feature vectors of the cluster are kept. According to other embodiments, a new filtering operation is conducted by for each stored image in the cluster (including the retrieved image 224), calculating a plurality of feature vectors, each representing the content of the stored image, performing a new matching operation between the plurality of feature vectors for all of the stored images in the cluster, and based on a result of the matching operation, perform a new filtering by filtering feature vectors which are matched between at least a threshold number of the stored images, and store the new filtered feature vectors.

In order to further increase the speed of the CBIR system described herein, the images of each cluster may be stored in a tree data structure. This is described in FIG. 5.

Figure 5:
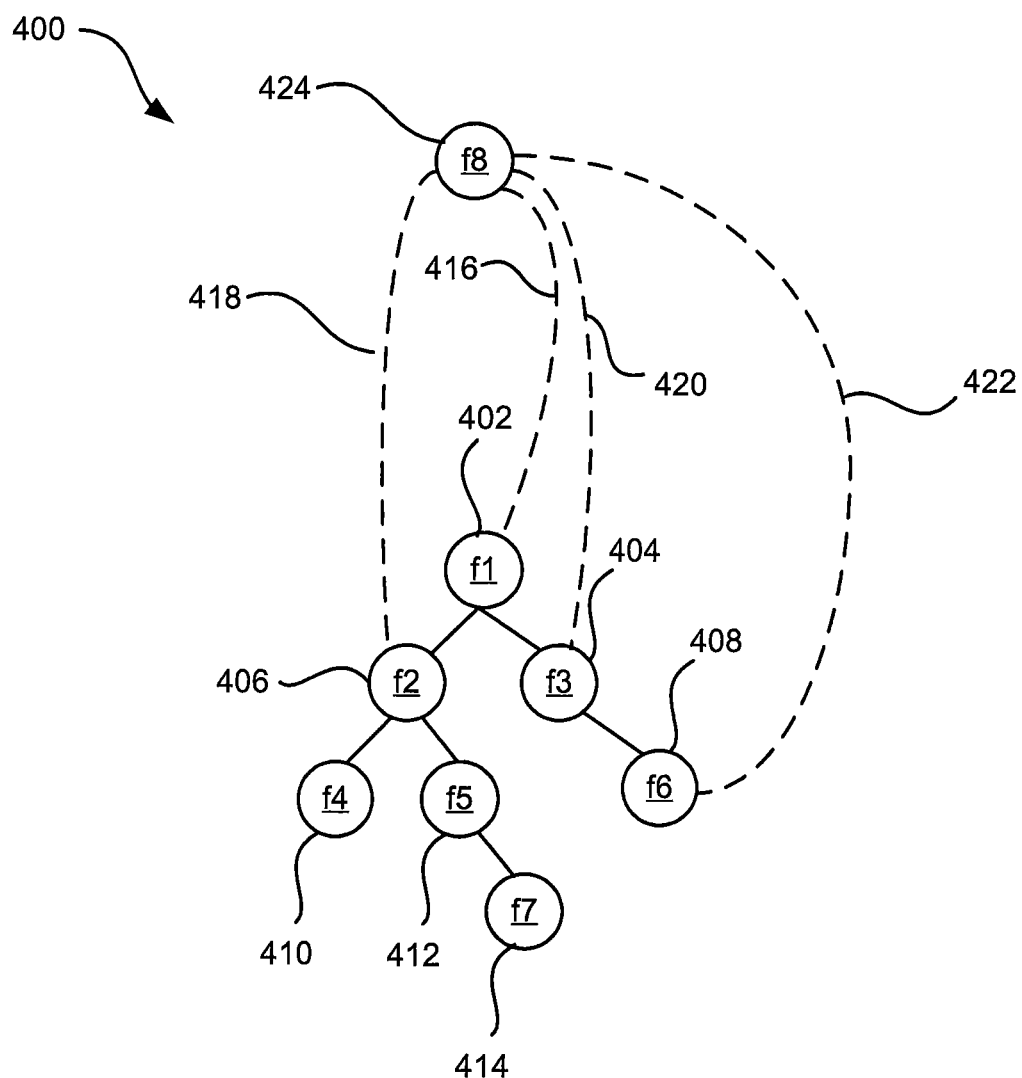

In FIG. 5, images 402-414 in a cluster 400 have been ordered in a tree data structure. According to some embodiments, the ordering the plurality of stored images 402-414 in the cluster 400 in a tree data structure based on the distance measures calculated S104 in order to perform the clustering. This results in a very fast algorithm for ordering the images in the tree data structure since no further calculations needs to be performed in order to determine the distances between the images. According to other embodiments, new distance measures are calculated based on the filtered feature vectors for the cluster. This may result in a more accurate ordering since more features than just the global feature vector are taken into account when calculating the distance measures between the images.

By ordering the plurality of stored images 402-414 in a tree data structure it is understood to mean that each image of the plurality images 402-414 corresponds to a node in the tree data structure, and that one image of the plurality of images 402-414 corresponds to a root node in the tree data structure. In other words, the image that has the shortest distance to all the others will be chosen as the "root". The remaining images will be ordered according to the distance measures to the root and to each other. Such ordering is well known and left to the skilled person to implement.

In FIG. 5, first a comparison 416 between additional feature vectors f8 and feature vectors f1 referred to by the image 402 corresponding to the root node of the tree data structure is performed. This comparison 416 results in a distance measure between a retrieved image 424 for which a similar image should be found and the image 402. Subsequently, a distance measure is calculated in the same way (by comparisons 418, 420) between the retrieved image 424 and the images 404, 406 corresponding to the children nodes of the root node of the tree data structure. If the distance measures to the images 404, 406 are calculated to be larger than the distance measure to the root node image 402, the root node image 402 may be selected as the most similar image (optionally if the distance measure is below a threshold as described above). In the case described in FIG. 5, the distance measure to the image 404 corresponding to one of the two child nodes to the root node of the tree data structure is calculated to be lower than both the distance measure between the retrieved image 424 and the root node image 402 and the distance measure to the image 406 corresponding to a second of the two child nodes. Consequently, the search for the most similar image may be limited to a sub-tree of the node corresponding to the image 404. This sub-tree only comprises one node, and a distance measure to the image 408 corresponding to this node is calculated by a comparison 422 between the additional feature vectors f8 and feature vectors f6 referred to by the image 408. By ordering the stored images 402-414 in the cluster 400 in a tree data structure, the number of comparisons for determining the most similar image in the cluster is four, instead of the seven that would be needed if the images 402-414 were not ordered in a tree data structure.

If a new image is added to the cluster which is stored in a tree data structure, as described above, this image is also added to the tree data structure based already calculated distance measures or based on newly calculated distance measures.

By implementing a CBIR system according to the methods described herein, a quick and computationally effective CIBR system may be achieved. With such a system, the method for finding a similar image among a plurality of stored images may be employed for implementing other features in e.g. a smartphone, laptop, wearable cameras (also known as life-logging cameras), tablet computer etc. comprising a computer-readable storage medium with instructions (e.g. an installed computer program product) adapted to carry out any of the methods described herein, using its processing capability. Considering life-logging scenarios, where users may take more than 1000 images each day, it may be advantageous to be able to mark clusters as interesting and/or uninteresting in order determine if the retrieved image should be stored or deleted.

According to some embodiments, the CBIR system implementing nay of the methods described herein may comprise the functionality of marking a cluster as uninteresting. For example, in life-logging scenarios, the user, having a computer based job, may take several hundreds of images of his or hers computer screen. Such images will probably be clustered in the same cluster, and in order to not store more of such images, the user may mark the cluster with images of the computer screen as uninteresting and the CBIR system may then, for each retrieved image, determine if the retrieved image is similar to an image in a cluster marked as uninteresting, and if this is true, delete the retrieved image. In the scenario described in FIG. 2, wherein the left cluster 210 may comprise images of computer screens, if the matching cluster for the retrieved image 224 is determined to be the left cluster 210, the retrieved image 224 may be deleted.

In a similar way, a cluster may be marked as interesting, and the CBIR system may then, for each retrieved image, determine if the retrieved image is similar to an image in a cluster marked as interesting, and if this is true, store the retrieved image. The storage of the retrieved image may comprise storing the retrieved image in a cloud storage. This facilitates the feature of only storing images similar to images in a cluster marked as interesting in a cloud storage, while images not being similar to images in a cluster marked as interesting is either just stored in a local memory of camera device, or deleted. According to some embodiments, all clusters are marked as interesting until a user marks them as uninteresting.

The person skilled in the art realizes that the present invention by no means is limited to the order of the steps in the exemplary embodiment of the method described above. Moreover, further variations are possible within the scope of the appended claims. For example, other algorithms then the above specified algorithms for calculating feature vectors may be employed. Such other algorithms comprise Blob detection or histogram of oriented gradients.

The invention claimed is:

1. A method for searching for a similar image among a plurality of stored images, comprising the steps of:
   for each stored image, calculating only one feature vector representing the content of the stored image,
   calculating distance measures between each stored image of the plurality of stored images by using the one feature vector calculated for each image,
   clustering the plurality of stored images into one or more clusters of stored images based on the calculated distance measures, wherein each cluster comprises one or more stored images,
   for each cluster comprising a plurality of stored images,
      for each stored image in the cluster, calculating a plurality of feature vectors, each representing the content of the stored image,
      performing a matching operation between at least some of the plurality of feature vectors for all of the stored images in the cluster, and
      based on a result of the matching operation, filtering feature vectors which are matched between at least a threshold number of the stored images, and
      storing the filtered feature vectors,
   retrieving an image for which a similar image should be found,
   calculating a plurality of additional feature vectors for the retrieved image,
   finding a similar image among the plurality of stored images by using the stored filtered feature vectors for at least one of the one or more clusters, and the additional feature vectors.

2. The method according to claim 1, wherein the step of storing the filtered feature vectors comprises:
   storing the filtered feature vectors with a reference to the cluster.

3. The method according to claim 2, wherein the step of finding a similar image among the plurality of stored images comprises:
   finding a matching cluster by comparing the additional feature vectors with the filtered feature vectors for each cluster, and
   finding a similar image among the plurality of stored images in the matching cluster.

4. The method according to claim 1, wherein the step of storing the filtered feature vectors comprises:
   for each stored image in plurality of stored images, storing the filtered feature vectors corresponding to the content of the stored image with a reference to the stored image.

5. The method according to claim 1, wherein the step of storing the filtered feature vectors comprises:
   storing the filtered feature vectors with a reference to the cluster, and
   for each stored image in plurality of stored images, storing the filtered feature vectors corresponding to the content of the stored image with a reference to the stored image.
   wherein the step of finding a similar image among the plurality of stored images comprises:
   finding a matching cluster by comparing the additional feature vectors with the filtered feature vectors for each cluster, and
   finding a similar image among the plurality of stored images in the matching cluster by for at least some images in the matching cluster, comparing the additional feature vectors with the filtered feature vectors corresponding to the content of the stored image.

6. The method according to claim 1, further comprising the step of:
   for each cluster comprising a plurality of stored images, ordering the plurality of stored images in a tree data structure based on the calculated distance measures, wherein each image of the plurality of images corresponds to a node in the tree data structure, and wherein one image of the plurality of images corresponds to a root node in the tree data structure.

7. The method according to claim 1, further comprising the steps of:
   marking a cluster as uninteresting,
   determining if the retrieved image is similar to an image in a cluster marked as uninteresting, and if this is true, deleting the retrieved image.

8. The method according to claim 1, further comprising the steps of:
   marking a cluster as interesting,
   determining if the retrieved image is similar to an image in a cluster marked as interesting, and if this is true, storing the retrieved image.

9. The method according to claim 8, wherein the step of storing the retrieved image comprises storing the retrieved image in a cloud storage.

10. The method according to claim 1, wherein the matching operation comprises using a random sample consensus (RANSAC) algorithm.

11. The method according to claim 1, wherein the plurality of feature vectors are calculated by using a Scale-invariant feature transform (SIFT) algorithm or a Speeded Up Robust Features (SURF) algorithm.

12. The method according to claim 1, wherein the distance measures calculated between each stored image of the plurality of stored images by using the one feature vector calculated for each image is calculated by using an earth mover's distance (EMD) algorithm.

13. The method according to claim 1, wherein in the step of for each stored image, calculating only one feature vector representing the content of the stored image, the only one feature vector is calculated based on an interpolated version of the stored image.

14. A computer program product comprising a non-transitory computer-readable storage medium storing instructions adapted to carry out the method of claim 1 when executed by an instruction processing device.

* * * * *